United States Patent
Dagley et al.

(10) Patent No.: US 12,461,976 B2
(45) Date of Patent: Nov. 4, 2025

(54) METHOD AND SYSTEM FOR CAPTURING DATA FROM REQUESTS TRANSMITTED ON WEBSITES

(71) Applicant: Capital One Services, LLC, McLean, VA (US)

(72) Inventors: Geoffrey Dagley, Mckinney, TX (US); Qiaochu Tang, The Colony, TX (US); Avid Ghamsari, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 679 days.

(21) Appl. No.: 17/518,165

(22) Filed: Nov. 3, 2021

(65) Prior Publication Data

US 2023/0140637 A1   May 4, 2023

(51) Int. Cl.
*G06Q 30/06* (2023.01)
*G06F 16/9535* (2019.01)
(Continued)

(52) U.S. Cl.
CPC ..... *G06F 16/9535* (2019.01); *G06Q 30/0627* (2013.01); *G06Q 30/0631* (2013.01); *G06Q 30/0643* (2013.01); *G06Q 40/03* (2023.01)

(58) Field of Classification Search
CPC .............. G06Q 30/06; G06Q 30/0627; G06Q 30/0631; G06Q 40/03
See application file for complete search history.

(56) References Cited

U.S. PATENT DOCUMENTS 7,899,710 B1 *  3/2011  Walker ............... G06Q 30/0224
                                                    705/26.7
9,953,358 B1 *  4/2018  Robertson .......... G06Q 30/0631
(Continued)

FOREIGN PATENT DOCUMENTS

CN        110990471 A      4/2020
WO   WO-2016117818 A1 *   7/2016   ......... G06Q 30/0271

OTHER PUBLICATIONS

Burkhart, Katie . "Pre-Qualified vs. Pre-Approved Auto Financing | Capital One Auto Navigator." Capital One Auto Navigator, Oct. 20, 2021, www.capitalone.com/cars/learn/getting-a-good-deal/prequalified-vs-preapproved-autofinancing/1142.*

(Continued)

*Primary Examiner* — Jeffrey A. Smith
*Assistant Examiner* — Jennifer V Lee
(74) *Attorney, Agent, or Firm* — Sterne, Kessler, Goldstein & Fox P.L.L.C.

(57) ABSTRACT

The method, system, and non-transitory computer-readable medium embodiments described herein capture request data from requests transmitted on websites. In various embodiments, a server receives an HTML file including content of a first website from a web-component configured to extract the content of the first website. The content includes information about a search that was executed on the first website and returned a set of items. The server generates a profile of the user based on the information about the search in the HTML file and identifies a new item that corresponds to the profile. The server further detects authentication details of the user on a second website based on the user identifier and causes display of item data of the new item and the set of items on the second web site in response to detecting the authentication details of the user.

16 Claims, 9 Drawing Sheets

(51) Int. Cl.
   *G06Q 30/0601* (2023.01)
   *G06Q 40/03* (2023.01)

(56) References Cited

U.S. PATENT DOCUMENTS

| | | |
|---|---|---|
| 10,565,594 B1 | 2/2020 | Moore et al. |
| 10,585,942 B2 | 3/2020 | Ramer et al. |
| 10,628,503 B2 | 4/2020 | Title et al. |
| 10,733,656 B1 | 8/2020 | Price et al. |
| 2001/0047307 A1 | 11/2001 | Bennett et al. |
| 2007/0143283 A1 | 6/2007 | Spencer et al. |
| 2007/0192198 A1* | 8/2007 | Schwarz ............ G06Q 30/0601 705/26.1 |
| 2009/0006322 A1 | 1/2009 | Chang et al. |
| 2013/0241952 A1 | 9/2013 | Richman et al. |
| 2015/0058244 A1 | 2/2015 | Ramberg |
| 2018/0046623 A1* | 2/2018 | Faith ................... G06F 16/9536 |
| 2019/0057103 A1 | 2/2019 | Quong |

OTHER PUBLICATIONS

International Search Report and Written Opinion directed to related application No. PCT/US2022/079151, mailed Jan. 18, 2023, 2 pages.

\* cited by examiner

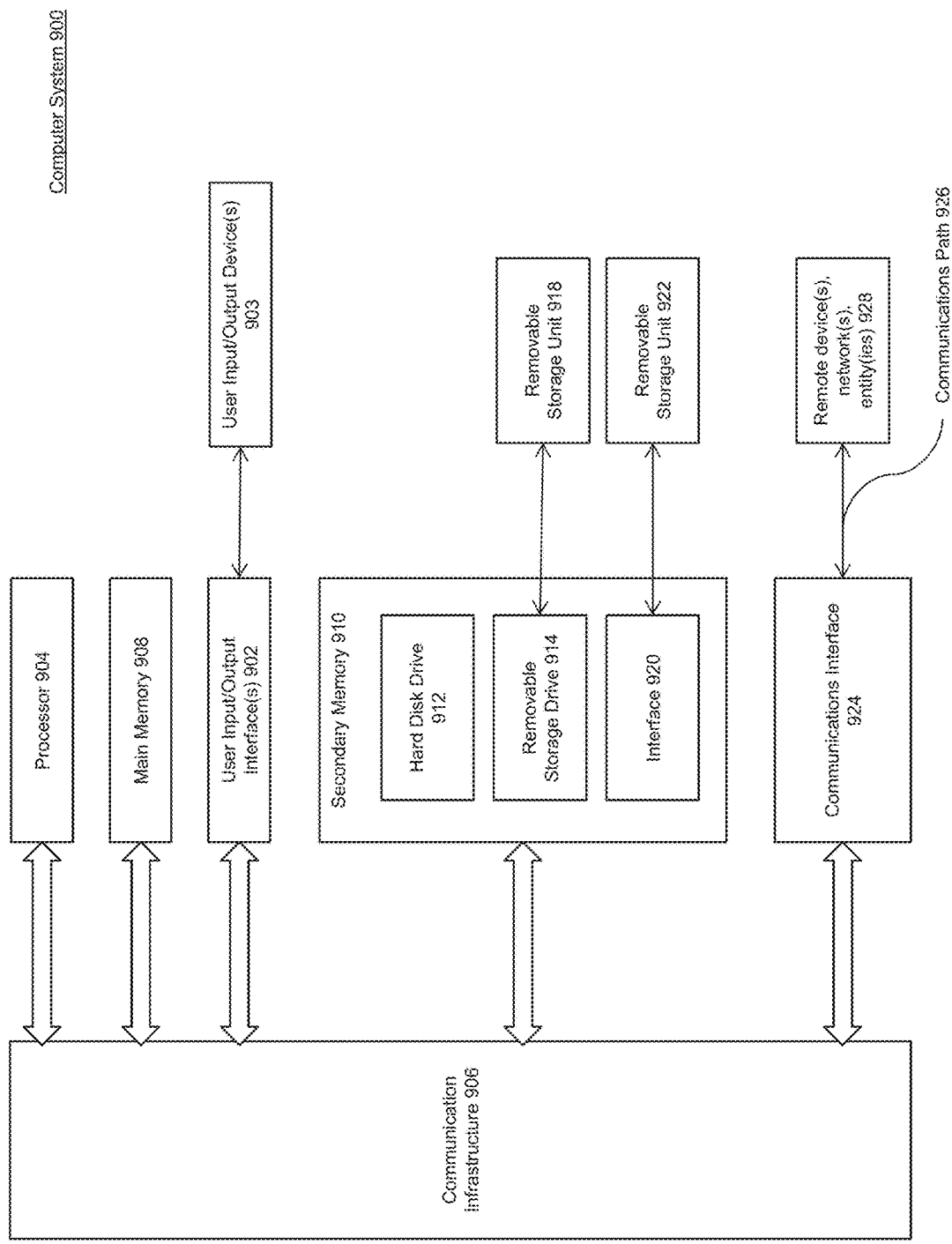

METHOD AND SYSTEM FOR CAPTURING DATA FROM REQUESTS TRANSMITTED ON WEBSITES

BACKGROUND

Websites often provide users with search capabilities. The search capabilities for the given website may allow a user to search for items (e.g., retail products, cars, real property, etc.) available at a given entity associated with the website. For example, a car dealership's website may allow a user to search for vehicles available at the car dealership. A user may use the search capabilities to indicate their preferences for the desired item. For example, if the user is looking for a vehicle, the user may indicate a price range, make, model, mileage, type, or the like using the search capabilities of the car dealership's website. However, if the car dealership does not stock the desired vehicle that meets the user's search criteria requirements, the user's efforts may be futile. As a result, the user may have to re-input the search criteria and repeatedly execute the search on other car dealerships' websites until they find the desired vehicle. Furthermore, even when the user finds the desired vehicle, the user may not know whether they can purchase the desired vehicle. Therefore, conventional methods to find the desired item using a given website's search capability may be a time-consuming and error-prone process.

BRIEF DESCRIPTION OF THE DRAWINGS

The accompanying drawings are incorporated herein and form a part of the specification.

FIG. 9 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
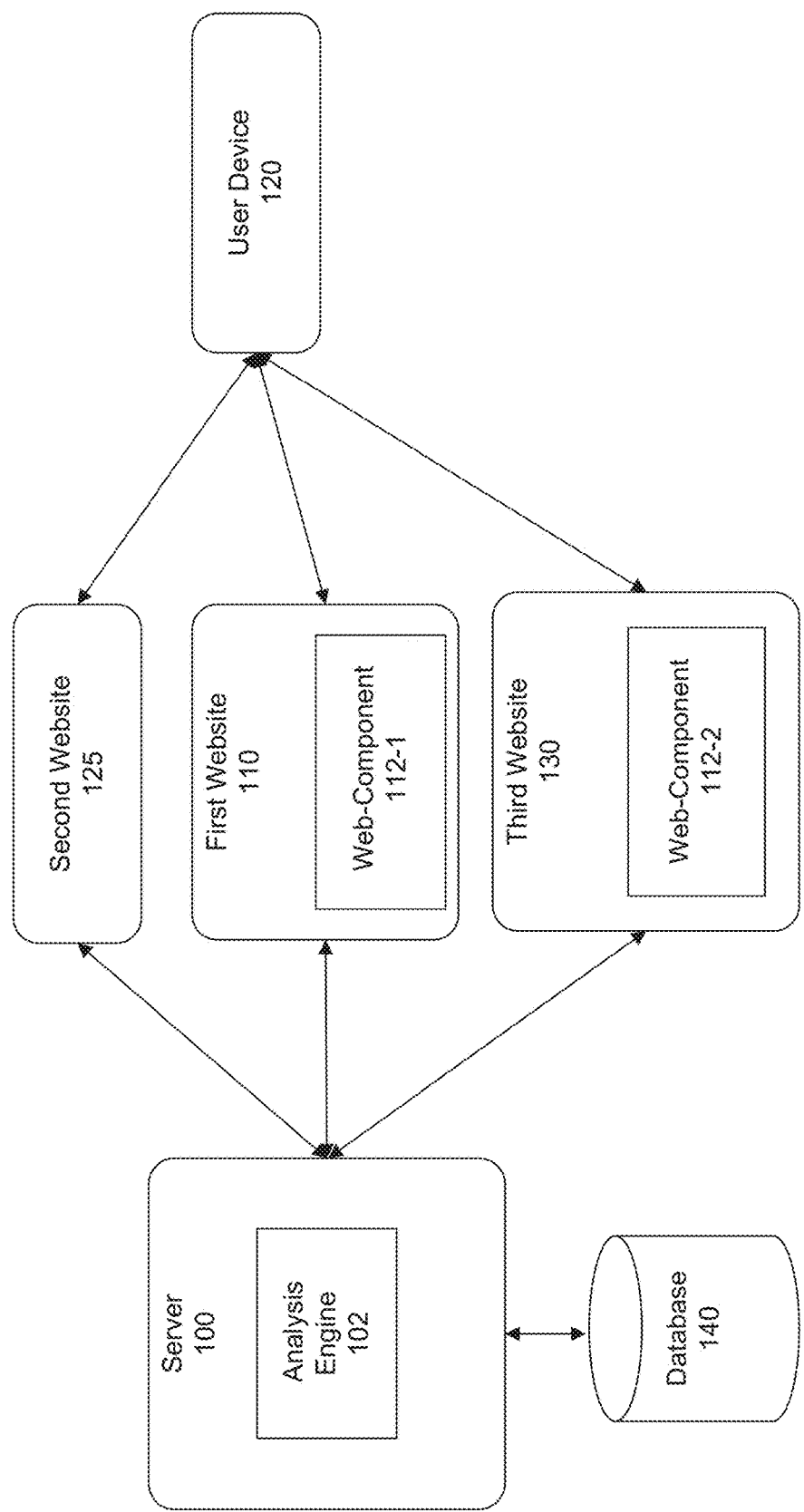
FIG. 1 is a block diagram of a system for identifying items for a user by capturing the user's search parameters from a website, according to some embodiments.

Provided herein are system, apparatus, device, method, and/or computer program product embodiments, and/or combinations and sub-combinations thereof for capturing data from requests transmitted on websites.

As described above, a user may need to find an item available at an online entity, such as a retailer, car dealership, or the like. The user may use the entity's website to search for the item. In this regard, the user may indicate their preferences regarding the item by identifying search parameters on the entity's website. For example, a user may search for a vehicle on a car dealership's website. The user may indicate their preference in make, model, price range, year, mileage, type, etc., on the car dealership's website when searching for the vehicle. If the user does not find their desired vehicle at the car dealership, they may have to execute a similar search on other car dealerships' websites. This may be a time-consuming process. Furthermore, the search capabilities provided across different car dealerships' websites may vary greatly. As such, each of the searches may be executed with a varied efficacy. Therefore, the process may be error-prone and inefficient.

The method, system, and non-transitory computer-readable medium embodiments described herein solve these problems by capturing request data from different websites. In various embodiments, a server receives an HTML file including the content of a first website from a web-component configured to extract the content of the first web site in response to executing code embedded in the first website. The content includes information about a search that was executed on the first website and returned a set of items. The content also includes a user identifier of a user interfacing with the first website. The server generates a profile of the user based on the information about the search in the HTML file and identifies a new item that corresponds to the profile. The server further detects authentication details of the user on a second website based on the user identifier and causes display of item data of the new item and the set of items on the second website in response to detecting the authentication details of the user.

The server may also receive a search request from the second website or third website based on the user's input. The server may use the profile to identify a new set of items based on the search request from the second web site or third web site.

The above configuration allows the user to easily find the desired item rather than re-executing a search on multiple websites. Furthermore, the configuration searches multiple different inventories of different entities using the user's search parameters. By doing so, the configuration increases the likelihood of identifying the desired item. Therefore, the method, system, and non-transitory computer-readable medium embodiments described herein increase the efficiency and efficacy of searching for the desired item compared to conventional systems.

FIG. 1 is a block diagram of a system for capturing data from requests transmitted on different websites, according to some embodiments. In various embodiment, the system can include a server 100, user device 120, and database 140. User device 120 may be configured to access first website 110, second website 125, and third website 130. First website 110, second website 125, and third website 130 may be in communication with server 100. Server 100 may be in communication with database 140.

First website 110 may be hosted by a third-party server and may be accessible to user device 120 through a portion of the Internet or other network. Third website 130 may be hosted by a different third-party server and may be accessible to user device 120 through a portion of the Internet or other network. Second website 125 may be hosted by server 100 or a different server and may be accessible to user device 120 through a portion of the Internet or other network. Server 100 may be in communication with first website 110 and second website 125 through a different or same portion of the Internet or some other network.

Server 100, user device 120, and database 140 can be connected through wired connections, wireless connections, or a combination of wired and wireless connections. As an example, server 100 and database 140 can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

User device 120 may be configured to access first website 110, second website 125, or third website 130 through an application executing on user device 120, such as an internet browser. In various embodiments, user device 120 may be configured to access first website 110, second website 125, or third website 130 using a web-based application executing on user device 120.

First website 110 may be a third-party website. First website 110 may include item data about one or more items available at the third party. An entity associated with server 100 may provide an executable code to the administrator of first website 110. The executable code may be embedded in first website 110 as web-component 112-1. As a non-limiting example, web-component 112-1 may be a JavaScript web component.

Similarly, third website 130 may be a different third-party website. Third website 130 may include item data about one or more items available at the different third-party. An entity associated with server 100 may provide an executable code to the administrator of first website 110. The executable code may be embedded in first website 110 as a web-component 112-2. As a non-limiting example, web-component 112-1 may be a JavaScript web component.

Web-component 112-1 may include instructions to include a GUI element on first website 110 each time first website 110 is loaded on user device 120. Similarly, web-component 112-2 may include instructions to include a GUI element on third website 130 each time third website 130 is loaded on user device 120. In various embodiments, the GUI element on first website 110 or third website 130 may include information about the items included on a webpage of first website 110 or third website 130 in the properties of the respective GUI element.

In various embodiments, web-components 112-1 and 112-2 may also include instructions to execute an automated script based on the executable code each time first website 110 and third website 130 are loaded on user device 120, respectively. The automated script may be configured to execute a web-scraping algorithm to scrape the content of the webpage and generate an HTML, file including the content of the webpage. The content may include elements displayed on a webpage of first website 110 or third website 130. The elements may be information about items displayed on the webpage of first website 110 or third website 130. For example, web-components 112-1 or web-component 112-2 may implement a SCRAPY application developed in Python. The SCRAPY application is a web-crawler framework that is configured to scrape data from websites.

In various embodiments, first website 110 and third website 130 may include web-component 112-1 or 112-2 for each item rendered on first website 110 and third website 130. Each web-component 112-1 or 112-2 may include item data about the item. For example, web-component 112-1 or 112-2 may include the item data in the properties of the corresponding GUI element.

Web-components 112-1 and 112-2 may generate an HTML file each time a webpage of first website 110 or second website 130 is loaded on user device 120. The HTML file may include item data about the items included on the webpage, as stored in the properties of the GUI element corresponding to web-component 112-1 or 112-2. Alternatively, the HTML file may include content scraped from the webpage. Web-components 112-1 and 112-2 may be configured to transmit the HTML file to server 100 each time an HTML file is generated.

Second website 125 may be an aggregator website. Specifically, second website 125 may allow the user to search for information associated with items available at an entity associated with first website 110 and a different entity associated with third website 130. In various embodiments, second website 125 may be associated with the administrator of server 100.

As a non-limiting example, first website 110 may be a car dealership's website configured to render information about vehicles available for sale at the car dealership. Similarly, third website 130 may be a different car dealership's website configured to render information about vehicles available for sale at the different car dealership. Second website 125 may allow a user to search for information associated with vehicles available at the car dealership associated with first website 110 and the different car dealership associated with third website 130.

The entity associated with server 100 may be a financial institution, which provides loans for purchasing vehicles from the car dealership. The entity may provide an executable code to the car dealership to be embedded on first website 110 (e.g., the car dealership's website) and third website 130 (e.g., the different car dealership's website). In various embodiments, second website 125 may be associated with server 100 and the financial institution.

Web-components 112-1 and 112-2 may include instructions for rendering a GUI element (e.g., a button) on first website 110 and third website 130, respectively. The user may select the GUI element to transmit a request to generate a loan, financing options, or prequalification for the loan or financing options. Web-components 112-1 and 112-2 may include instructions to execute an automated script based on the executable code. The respective executable code is configured to extract the content of a webpage of first website 110 or third website 130 and generate an HTML file including the content of the webpage of first website 110 or third website 130.

The content may include item data about the vehicles included on the webpage, search parameters of a search for a vehicle, information about the applied filters when searching for vehicles, information about the user's click history on the webpage, information about the user's viewing history on the webpage, etc. The user's click history may include the information about the links on the webpage that the user clicked. Furthermore, the user's click history may include information about the vehicles associated with the links that were clicked. For example, if a given link directs the user to a webpage including information about a specific vehicle, the user's click history may include information about the specific vehicle. The viewing history may include the duration of time a user viewed each respective vehicle on the webpage and information about the respective vehicle. The item data about the vehicles may include attributes about each vehicle, such as make, model, price, year, mileage, type, etc. The content may also include a user identifier.

Server 100 may receive an HTML, file including the content of the first website 110 or third website 130 from web-component 112-1 or web-component 112-2. Analysis engine 102 may identify a set of elements (e.g., search parameters, applied filters, item data about vehicles on the webpage, user viewing history, user click history, etc.) corresponding to a search executed on first website 110 or third website 130. Analysis engine 102 may identify the search that was executed on first website 110 or third web site 130 based on the set of elements. Analysis engine 102 may also identify a set of vehicles included in the search results in response to executing the search on first website 110 or third website 130.

Analysis engine 102 may identify attributes about the set of vehicles. The attributes may include make, model, price, year, mileage, type, etc. Furthermore, analysis engine 102 may build a profile for the user that reflects the user's preferences based on the set of elements and the attributes. For example, analysis engine 102 may determine that, based on the set of elements, a user viewed information about a given vehicle of the set of vehicles on the webpage for a longer period of time than any other vehicles in the set of vehicles. As a result, analysis engine 102 may determine that the user prefers one or more attributes about the given vehicle. Analysis engine 102 may cross-reference the attributes about the given vehicle with the other set of elements and the attributes of the other set of vehicles. Analysis engine 102 may generate a profile of the user's preferences based on the set of elements.

Analysis engine 102 may identify a new vehicle based on the profile. The new vehicle may correspond to one or more of the elements of the set of elements. The new vehicle may be available at various car dealerships.

Analysis engine 102 may detect a user's authentication details being input on second website 125. The authentication details may be a username and password. Analysis engine 102 may match the user identifier included in the content in the HTML file with the users' authentication details.

In response to detecting the user's authentication details being input on second website 125, analysis engine 102 may instruct second website 125 to render information about the new vehicle on second website 125. The item data may include attributes about the new vehicle such as make, model, year, mileage, price, type, etc. Moreover, the information may include a link to a given car dealership's website where the new vehicle is available. Analysis engine 102 may also instruct second website 125 to render information about the set of vehicles.

Database 140 may be one or more data storage devices configured to store data. Analysis engine 102 may store item data about the new vehicle, set of elements, and item data about the set of vehicles in database 140. Furthermore, database 140 may store the profile for the user. The profile may include data representing the user preferences regarding vehicles. The user preferences may be associated with item data of the set of vehicles, including but not limited to make, model, year, mileage, price, type, etc. Analysis engine 102 may also store the HTML file in database 140.

Second website 125 may also allow the user to execute a search for vehicles available across car dealerships. A search request received by second website 125 may be transmitted to server 100. The search request may include search parameters. Analysis engine 102 may retrieve the item data about a new set of vehicles based on the search parameters from database 140. Furthermore, analysis engine 102 may retrieve the profile from database 140. Analysis engine 102 identifies one or more vehicles available across various car dealerships using the search parameters of the search request and the profile of the user. The one or more vehicles may be included in the set of vehicles or the new set of vehicles. Analysis engine 102 may instruct second website 125 to render item data about one or more vehicles.

Figure 2:
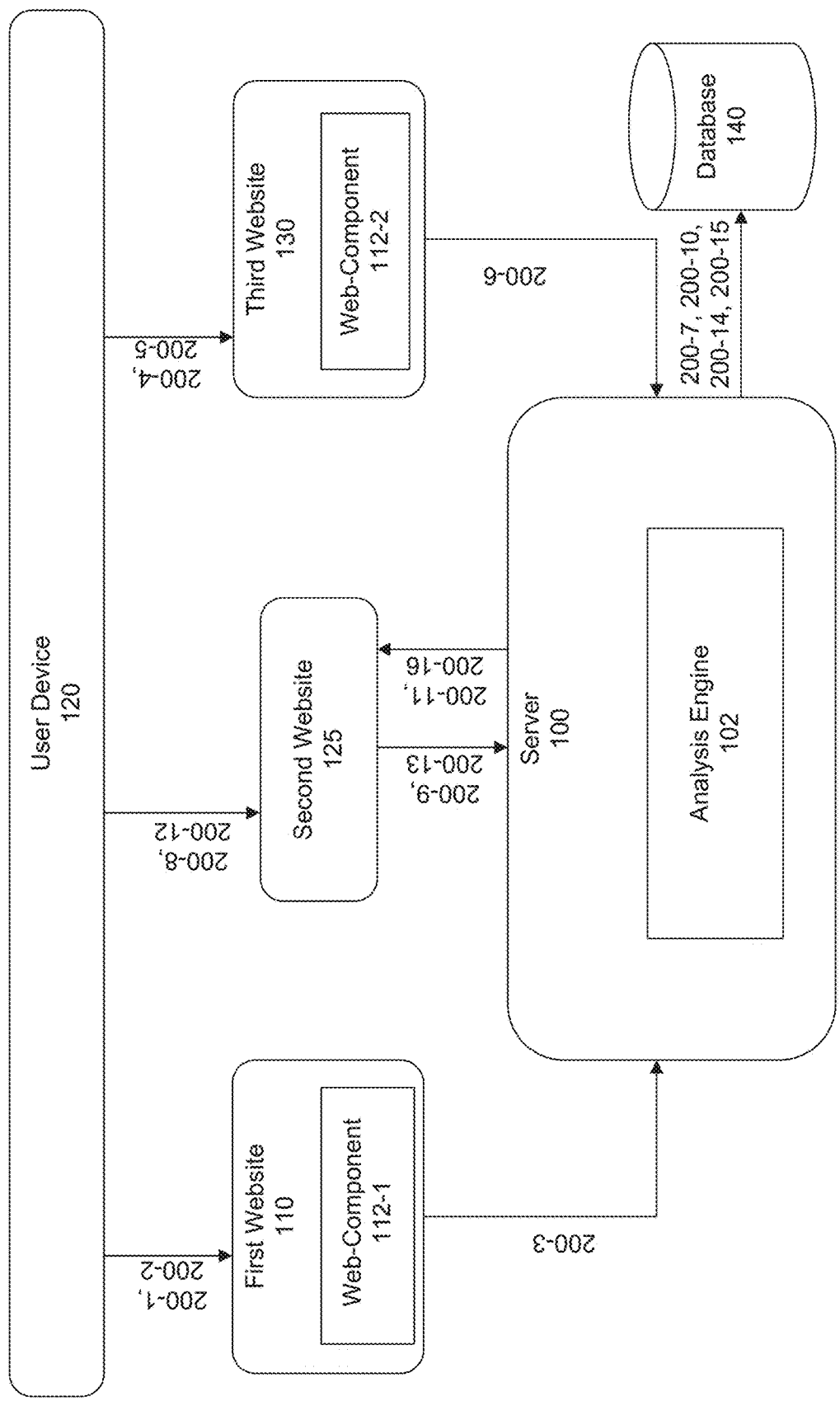
FIG. 2 is a block diagram of data flow in the system for identifying items for a user by capturing the user's search parameters from a web site, according to some embodiments.

FIG. 2 is a block diagram illustrating the data flow in the system for updating and validating data stored in the database, according to some embodiments. In a given embodiment, user device 120 may transmit request 200-1 to first website 110. First website 110 may be rendered on a display of user device 120 in response to receiving request 200-1. Each time a webpage of first website 110 is loaded on user device 120, web-component 112-1 may execute code embedded in first website 110. The code, when executed, may scrape the content of the webpage of first website 110. Web-component 112-1 may generate an HTML file including the content of first website 110 and transmit the HTML file to server 100. When executed, the code may also render a GUI element on the webpage of first website 110. One or more webpages of first website 110 may include the web-component 112-1. Therefore, each time any one of the one or more webpages is loaded, web-component 112-1 may execute the code to scrape the content of the respective webpage and generate an HTML file including the content of the respective webpage.

At least one of the webpages of first website 110 may include a search field for searching for items. As a non-limiting example, first website 110 may be a car dealership's website and the items may be vehicles available at the car dealership. User device 120 may provide input with respect to the search field. The search field may include a text input box, radio button selections, dropdown menus, etc. User device 120 may generate and transmit request 200-2 to execute the search based on the search parameters input by user device 120 using the search field. The executed search may correspond with a search string (e.g., a query).

In response to receiving request 200-2, first website 110 may execute the search using the search parameters and return search results, including a set of items corresponding to the search parameters. First website 110 may reload the webpage to display the search results. The set of items may be a set of vehicles. The webpage may include the search parameters. Furthermore, the search results may include item data about the set of vehicles, and the item data may include make, model, year, price, mileage, type, etc.

In response to reloading the webpage, web-component 112-1 may execute the code embedded on the webpage. The code, when executed, may scrape the content of first web site 110. The content may include the information about the search executed by first website 110. The information may include the search string, search parameters, applied filters, user click history, user viewing history, and the items about the set of items (e.g., vehicles). The search parameters may include input in the text input box and selections of radio buttons and dropdown menu elements. Web-component 112-1 may generate a first HTML file including the content of the webpage and transmit the first HTML file to server 100 in request 200-3. The content may include the information about the search executed by first website 110.

In some embodiments, when executed by web-component 112-1, the code may also scrape the cookies of the webpage. The cookies may include a user identifier of the user and the geographic location of user device 120. The user identifier may correspond with the user's email address or a username that the user uses to interact with first website 110. The content included in the first HTML file may also include the user identifier. Furthermore, the content may also include the geographic location of user device 120, as indicated in the cookies of the webpage.

In response to receiving the first HTML file, analysis engine 102 may identify a first set of elements corresponding to the information about the search executed on first website 110 from the content in the first HTML file. The first set of elements may include search parameters, user click history, user viewing history, or any other feature or features determined to be relevant to the search request or the user's preferences. For example, the first set of elements may indicate which items the user viewed on the webpage. Additionally, the first set of elements may indicate which items were viewed for a longer period of time by the user. The first set of elements may also include other default parameters included in the search, such as a car dealership's inventory. Analysis engine 102 may also identify a first item data about the set of items included in the content in the first HTML file. The first item data about the set of items may include attributes associated with each of the set of items. For example, the set of items may be a set of vehicles. The attributes may include but are not limited to make, model, price, mileage, color, type, etc. The attributes may be included in the first set of elements.

Analysis engine 102 may generate a profile of the user based on the first set of elements. The profile may indicate the user preferences with respect to items. In various embodiments, when building the profile of the user, analysis engine 102 may assign a weight to each element of the first set of elements. The weight indicates an importance of a respective element. For example, analysis engine 102 may understand that for the user, make, model, and mileage is more important than color and options package. As such, attributes such as make, model, and mileage may be assigned greater weights than the color or options package. Analysis engine 102 may store the profile in database 140.

The user may also interact with user device 120 to access third website 130 by transmitting request 200-4 to third website 130. In response to receiving request 200-4, third website 130 may be loaded on user device 120. Each time a webpage of third website 130 is loaded on user device 120, web-component 112-2 may execute code embedded in third website 130. The code, when executed, may scrape the content of the webpage of third website 130. Web-component 112-2 may generate an HTML file including the content of third website 130 and transmit the HTML file to server 100. When executed, the code may also render a GUI element on the webpage of first website 110. One or more webpages of third website 130 may include the web-component 112-2.

Similar to first website 110, at least one of the webpages of third website 130 may include a search field for searching for items. As a non-limiting example, third website 130 may be a car dealership's website and the items may be vehicles available at the car dealership. First website 110 may be associated with a different website as compared to third website 130. User device 120 may provide input with respect to the search field. The search field may include a text input box, radio button selections, dropdown menus, etc. User device 120 may generate and transmit request 200-5 to execute the search based on the search parameters input by user device 120 using the search field. The executed search may correspond with a search string (e.g., a query).

In response to receiving request 200-5, third website 130 may execute the search using the search parameters and return search results, including a set of items corresponding to the search parameters. Third website 130 may reload the webpage to display the search results. The set of items may be a set of vehicles. The webpage may include the search parameters. Furthermore, the search results may include item data about the set of vehicles.

In various embodiments, web-component 112-2 may detect request 200-5. Web-component 112-2 may transmit an alert to server 100. The alert may include a user identifier, search parameters, and the set of items. Analysis engine 102 may retrieve the profile of the user from database 140 using the user identifier. Analysis engine 102 may filter the set of items based on the user preferences in the profile. Analysis engine 102 may transmit the filtered set of items to web-component 112-2. Web-component 112-2 may cause third website 130 to display the filtered set of items. In various embodiments, analysis engine 102 may identify a different set of items based on the search parameters and the user preferences in the profile. Analysis engine 102 may transmit the different set of items to web-component 112-2. Web-component 112-2 may cause third web site 130 to display the different set of items.

In response to reloading the webpage, web-component 112-2 may execute the code embedded on the webpage. The code, when executed, may scrape the content of third website 130. The content may include the information about the search executed by third website 130. The information may include the search string, search parameters, applied filters, user click history, user viewing history, and the items about the set of items (e.g., vehicles). The search parameters may include input in the text input box and selections of radio buttons and dropdown menu elements. Web-component 112-2 may generate a second HTML file including the content of the webpage and transmit the second HTML file to server 100 in request 200-6. The content may include the information about the search executed by third website 130.

As described above, when executed by web-component 112-2, the code may also scrape the cookies of the webpage. The cookies may include a user identifier of the user and the geographic location of user device 120. The content included in the second HTML file may also include the user identifier. Furthermore, the content may also include the geographic location of user device 120, as indicated in the cookies of the webpage.

In response to receiving the second HTML file, analysis engine 102 may identify a second set of elements corresponding to the information about the search executed on third website 130 from the content in the second HTML file. The second set of elements may include search parameters, user click history, user viewing history, or any other feature or features determined to be relevant to the search request or the user's preferences. For example, the second set of elements may indicate which items the user viewed on the webpage. Additionally, the second set of elements may indicate which items were viewed for a longer period of time by the user. The second set of elements may also include other default parameters included in the search, such as a car dealership's inventory. Analysis engine 102 may also identify a second item data about the set of items included in the content in the second HTML file. The second item data about the set of items may include attributes associated with each of the set of items. For example, the set of items may be a set of vehicles. The attributes may include but are not limited to make, model, price, mileage, color, type, etc. The attributes may be included in the second set of elements.

Analysis engine 102 may update the user preferences in the profile of the user based on the second set of elements.

For example, analysis engine 102 may determine the similarities of the searches executed on first website 110 and third website 130 based on the first set of elements and the second set of elements. Furthermore, analysis engine 102 may determine similarities between the items that were viewed by the user on first website 110 and third website 130. In various embodiments, when building the profile of the user, analysis engine 102 may assign a weight to each element of the first and second set of elements.

Analysis engine 102 may transmit request 200-7 to database 140 to retrieve item data about items based on the profile of the user. For example, request 200-7 may be a request to retrieve information about vehicles available across various dealerships. The vehicles may include attributes that match one or more of the user preferences as indicated by the profile. For example, the user preferences may indicate that the user prefers the following attributes: "HONDA", "green", and "UNDER 50,000 miles."

Database 140 may return green HONDA vehicles with mileage under 50,000 available across various car dealerships. In some embodiments, the content in the first and second HTML files may also include a geographic location of user device 120. Therefore, database 140 may return vehicles available at various car dealerships within a given radius of the geographic location of user device 120. Alternatively, the user preferences may indicate a desired geographic location. As such, database 140 may return vehicles available at various car dealerships within a given radius of the desired geographic location. Analysis engine 102 may receive the items returned from database 140. Analysis engine 102 may identify an item (e.g., a new item) that matches most closely with the user preferences.

In some embodiments, analysis engine 102 may determine whether the user is prequalified for a loan for the vehicles in the first item data, the second item data, and the new vehicle. For example, analysis engine 102 may retrieve the user's information from database 140 using the user's authentication details. Analysis engine 102 may also retrieve a lender's policy from database 140. The lender's policy and methodology can include Bayesian regression algorithms, decision trees, pricing grids, or various equations to generate instant pricing structure data objects. As an example, the lender's methodology may include interfacing with a third-party credit bureau to execute a soft pull for the user. Soft pulls are soft credit inquiries that do not affect the user's credit score. Analysis engine 102 may use the user information, soft pull information, and information about a given vehicle to determine whether the user is prequalified for a loan for the given vehicle. In the event the user is not prequalified for a loan for a given vehicle of the set of vehicles, analysis engine 102 may remove or filter out the given vehicle from the first item data and the second item data. In the event the user is not prequalified for a loan for the new vehicle, analysis engine 102 may identify a different new vehicle. By doing so, analysis engine 102 may recommend vehicles to the user which they are eligible to purchase.

In some embodiments, analysis engine 102 may generate a score for the respective vehicle based on matching the set of attributes of the respective vehicle to the user preferences in the profile and the weight assigned to each element and attribute. Analysis engine 102 may determine the new vehicle should be recommended to the user in response to determining that the score of the respective vehicle is greater than a threshold amount. By doing so, analysis engine 102 identifies vehicles that the user likely prefers.

Analysis engine 102 may store the new item (e.g., identified item for the user), the first item data, and the second item data in database 140. Furthermore, analysis engine 102 may store the profile in database 140. Analysis engine 102 may correlate the new item, the first item data, the second item data, and the profile with the user in database 140. Analysis engine 102 may identify the user using the user identifier included in the content in the first and second HTML files. For example, the analysis engine 102 may match the user identifier (e.g., email address) with data associated with the user stored in database 140.

In some embodiments, analysis engine 102 may use the profile of the user, the profiles of other users, and the geographic location of the user and other users to identify geographic trends or a characteristic about the geographic location. Particularly, analysis engine 102 may store profiles of users in database 140. Analysis engine 102 may use the profiles of the users from a particular geographic location over a given time period to identify trends with respect to a given vehicle or particular geographic location. For example, the trend may indicate an increase in sales in the particular geographic location over the given period of time. Alternatively, the trend may indicate an increase or decrease in sales of a particular item in the particular geographic region over the given period of time.

User device 120 may access second website 125 via request 200-8. Second website 125 may be loaded on the internet browser of user device 120. As described above, second website 125 may be an aggregator website. Second website 125 may allow a user to search for item data associated with items available across multiple entities. The entities may include an entity associated with first website 110 and a different entity associated with second website 130.

Second website 125 may require a user to use their authentication details to sign in/log-in to second website 125. Therefore, request 200-8 may include the user's authentication details. The authentication details may include a username and password. Second website 125 may transmit the user's authentication details to server 100 in authentication request 200-9.

In response to receiving authentication request 200-9, server 100 may authenticate the user using the user's authentication details. Furthermore, analysis engine 102 may transmit request 200-10 to database 140 to retrieve the item data about the new item identified for the user and first and second item data correlated to the user in database 140 based on the user's authentication details. Server 100 may transmit instructions to second website 125 confirming authentication of the user in response 200-11. Response 200-12 may further include instructions to render the item data about the new item identified for the user and the first and second item data on the landing webpage displayed in response to the user successfully signing in to second website 125. In some embodiments, response 200-11 may include instructions to render item data about the new item. Alternatively, response 200-11 may include instructions to render the first and second item data. In some embodiments, the landing webpage of second website 125 may indicate that the first item data corresponds with the search results of the search executed on first website 110, and the second item data corresponds with the search results of the search executed on third website 130. Furthermore, the landing webpage of second web site 125 may indicate that based on the searches executed on first website 110 and third website 130, the user may prefer the new item.

As indicated above, the new item and the first and second item data may be vehicles available at car dealerships. In some embodiments, the vehicles may exclude any vehicle for which the user does not prequalify. The item data about the new vehicle and the first and second item data may also include information about where a respective vehicle is available for sale. For example, the item data may include an address of a car dealership, a phone number of a car dealership, or a website hyperlink to a car dealership.

Second website 125 may also provide a search functionality where users may search for available items. For example, users may search for vehicles for sale across various car dealerships. A user may input their desired search parameters and execute a search for the desired item by transmitting request 200-12 to second web site 125 using user device 120.

In response to receiving request 200-12, second website 125 may transmit request 200-13 to server 100 to identify a new set of items based on the search parameters (e.g., a new set of elements) received from the user device 120. Request 200-13 may include the search parameters and user's authentication details. Analysis engine 102 may transmit request 200-14 to database 140 to retrieve the profile of the user using the user's authentication details.

Analysis engine 102 may determine whether request 200-12 was received within a threshold period of time as when first website 110 and third website 120 executed the respective searches based on the timestamps in the first and second HTML, files. By doing so, analysis engine 102 confirms that the user's preferences that are reflected in the profile are current. Analysis engine 102 transmits request 200-15 to database 140 to retrieve the new set of items based on the search parameters and the profile. For example, analysis engine 102 may retrieve a new set of vehicles available at various car dealerships based on the search parameters and the user preferences reflected in the profile. Particularly, one or more attributes of each of the new set of vehicles may match the search parameters and/or the user preferences in the profile.

In some embodiments, analysis engine 102 may determine whether the user is prequalified for a loan for the vehicles in the new set of vehicles. In the event the user is not prequalified loan for a given vehicle of the new set of vehicles, analysis engine 102 may remove or filter out the given vehicle from the new set of vehicles.

In some embodiments, analysis engine 102 may generate a score for the respective vehicle in the new set of vehicles based on matching the set of attributes of each respective vehicle to the elements included in the user preferences and the weight assigned to each element of the set of elements. Analysis engine 102 may include the respective vehicle in the new set of vehicles in response to determining that the score of the respective vehicle is greater than a threshold amount. By doing so, analysis engine 102 identifies vehicles that a user likely prefers.

Analysis engine 102 may transmit the information about the new set of vehicles, excluding any vehicle for which the user does not prequalify, to second website 125 in response 200-16. Response 200-16 may include instructions for rendering the item data of the new set of vehicles as the search results on the respective webpage of second website 125. Second website 125 may render item data of the new set of vehicles. The item data about the new set of vehicles may include an image of the respective vehicle, make, model, color, year, price, type, etc. The item data about the new set of vehicles may also include information about where a respective vehicle is available for sale. For example, the item data may include an address of a car dealership, a phone number of a car dealership, or a website hyperlink to a car dealership.

Figure 3:
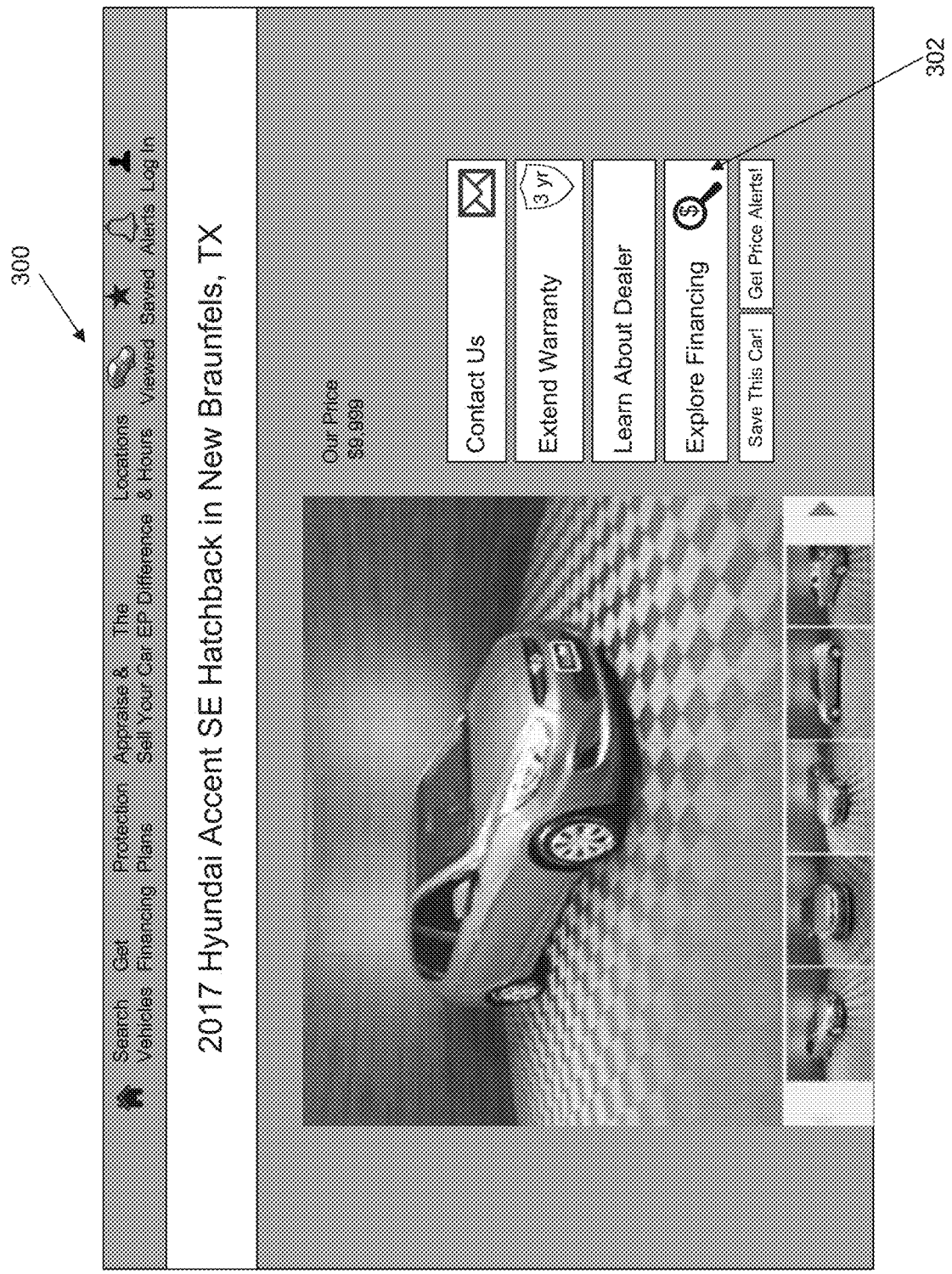
FIG. 3 illustrates a graphical user interface of a third-party website, according to some embodiments.

FIG. 3 illustrates a graphical user interface of a third-party website, according to some embodiments. FIG. 3 shall be described with reference to FIG. 1. As a non-limiting example, the third-party website (e.g., first website 110 or third website 130) can be a car dealership's website. The car dealership's website may execute web-components 112-1 and 112-2. Furthermore, the car dealership's website may include multiple webpages, including webpage 300. The car dealership's website may be displayed on user device 120.

Web-component 112-1 and 112-2 may be configured to render button 302 each time webpage 300 is loaded. In some embodiments, web-components 112-1 and 112-2 may be configured to render button 302 or another GUI element on other webpages of the car dealership's website. Web-components 112-1 and 112-2 may be configured to use a web-scrapping algorithm to scrape the content on webpage 300 and generate an HTML file including the content. Web-components 112-1 and 112-2 can transmit the HTML file to a server (e.g., server 100, as shown in FIG. 1).

Webpage 300 may include item data about a single vehicle. For example, webpage 300 may be displayed in response to a user selecting a vehicle from a different webpage of the car dealership's website. The content may include the make, model, price, year, VIN, or the like.

Webpage 300 may also include a search field. The search field may include one or more of a text input box, radio buttons, dropdown menus, etc. A user may provide their search parameters for searching for a vehicle available at the car dealership using the search field. For example, radio buttons may correspond to the desired mileage of a car. More specifically, a first radio button may correspond to "UNDER 50,000 MILES", a second radio button may correspond to "50,000-100,000 miles", and a third radio button may correspond with "OVER 100,000 miles". Additionally, a user may input text in a text input box, such as "HONDA", "TESLA", "GREEN CIVIC", etc. The dropdown menus may include selections of types of vehicles, such as "Sports Utility Vehicle (SUV)", "TRUCK", "MINIVAN", etc.

Web-components 112-1 and 112-2 may be configured to execute a web-scraping algorithm to scrape the content of other webpages of the car dealership's web site in response to each of the other webpages loading on user device 120. The other webpages may include item data about multiple vehicles (e.g., a webpage that displays search results including multiple vehicles). As a result, the content scraped by web-components 112-1 and 112-2 may include item data about the multiple vehicles.

The content may also include the search parameters indicated in the search field. The search parameters may include text and the selection of elements using the radio buttons or dropdown menus. For example, the text may include "HONDA" and a selection of the first radio button corresponding to "UNDER 50,000 miles". Moreover, the content may also include the search results of the search executed on first website 110. The search results may include information about a set of vehicles that correspond with the search parameters input by the user.

The car dealership's website may include various links or buttons related to the purchase of the product. One of the links or buttons may include a button 302. Button 302 may be associated with transmitting a prequalification request for a loan for purchasing the specified product. In an embodiment, button 302 may be associated with transmitting a prequalification request for a loan for purchasing multiple products. In an embodiment, button 302 may be associated with each of a plurality of items (e.g., vehicles) displayed on webpage 300 to enable user selection of a product-specific prequalification request for any one or more of the displayed plurality of items.

In response to the actuation of button 302, web-components 112-1 and 112-2 can launch a website (e.g., second website 125) to be rendered within webpage 300. The website can be used to transmit a request to generate loan offers or prequalification results for the item(s) displayed on webpage 300.

In some embodiments, the website may be associated with server 100. For example, the website can be hosted by server 100 or can be associated with the same entity that manages server 100. Web-components 112-1 and 112-2 may execute the web-scraping algorithm to scrape the content of webpage 300 and generate an HTML file including the content in response to a user actuating button 302. Web-components 112-1 and 112-2 may transmit the HTML file to server 100 or another server responsible for generating the loan offers or prequalification results while launching the website.

Figure 4:
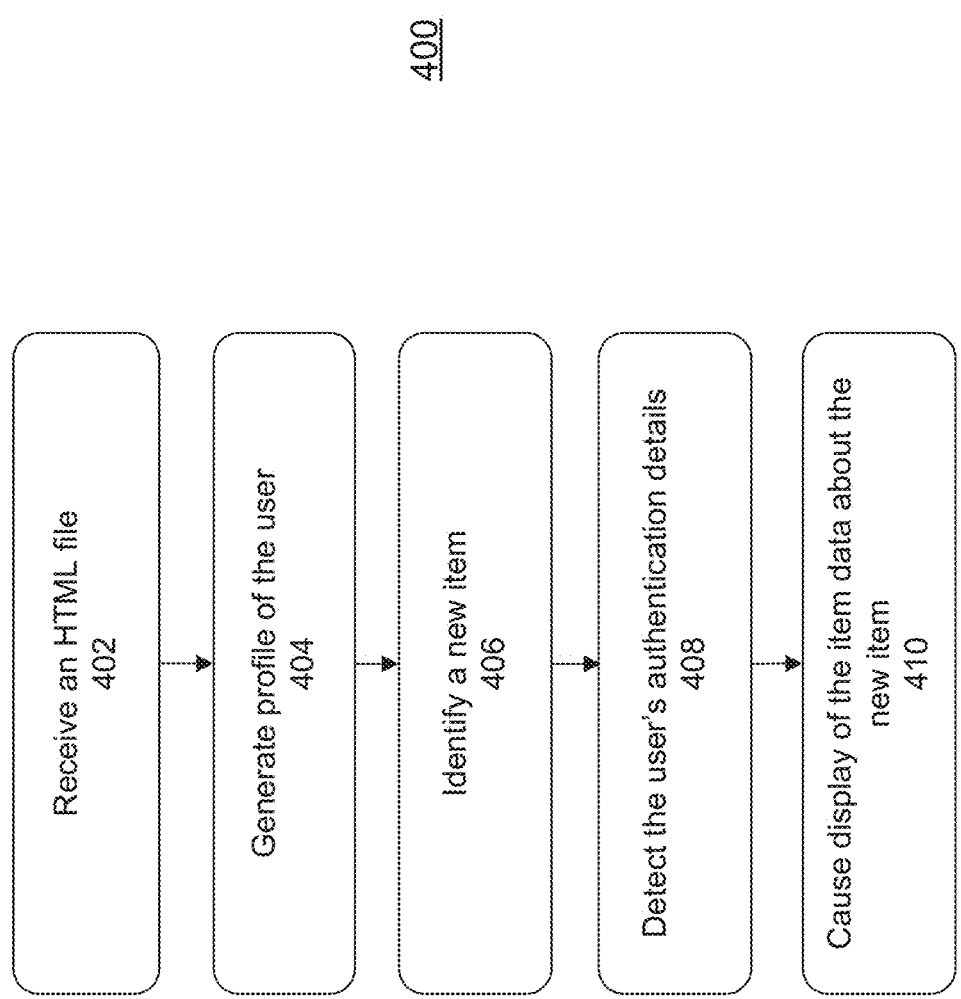
FIG. 4 is a flowchart illustrating a process for identifying and rendering an item based on a user's search parameters captured from a different web site, according to some embodiments.

FIG. 4 is a flowchart illustrating a process for identifying and rendering an item based on a user's search parameters captured from a different website, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 4, as will be understood by a person of ordinary skill in the art.

Method 400 shall be described with reference to FIG. 1. However, method 400 is not limited to those example embodiments.

In operation 402, server 100 receives an HTML file including content from first website 110 from web-component 112-1. Web-component 112-1 may be configured to extract the content of first website 110 in response to executing code embedded on first website 110. The content includes information about a search that was executed on first website 110 and returned a set of items. For example, the information about the search includes one or more of user click history, user viewing history, search parameters, or the item data about the set of items. The set of items may be a set of vehicles that correspond to the search results. In this regard, the content may include the search parameters and the item data about the set of vehicles. The item data may include make, model, year, price, type, mileage, etc. The content may also include a user identifier.

In operation 404, analysis engine 102 generates a profile of the user. Specifically, analysis engine 102 identifies a set of elements about the search from the HTML file. The set of elements may include data related to the user click history, user viewing history, search parameters, or the item data about the set of items. Analysis engine 102 may generate a profile for the user based on the set of elements. The profile may include user preferences with respect to the items. In particular, the profile may include weights associated with each of the set of elements. The weights may indicate a degree of user preference.

In operation 406, analysis engine 102 identifies a new item that corresponds to the user preferences in the profile. The new item may be a new vehicle, and the new vehicle may be identified for the user based on the user preferences identified from the profile. In some embodiments, analysis engine 102 may identify the new vehicle for the user based on the user being able to prequalify for a loan for the new vehicle. For example, analysis engine 102 may retrieve user information using the user identifier and item data about the new vehicle. Analysis engine 102 may determine whether a user prequalifies for the loan for the new vehicle using the user information, item data about the new vehicle, lender's credit policy, and lender's methodology. Analysis engine 102 may store the item data about the new item in database 140.

In operation 408, analysis engine 102 detects the user's authentication details being input on second website 125. The authentication details may be the user's username and password, and the user may input their username and password to sign in/log-in to second website 125. Second website 125 may transmit the user's username and password to server 100 for authentication. Analysis engine 102 may match the user identifier to the username and password of the user.

In operation 410, analysis engine 102 causes display of the item data of the new item on and each of the set of items on second website 125 in response to detecting the user's authentication details being input on second website 125. Analysis engine 102 may retrieve the item data about the new item (e.g., vehicle) from database 140 in response to detecting the user's authentication details being input on second website 125. By doing so, the new item or vehicle may be recommended to the user as soon as the user logs onto second website 125.

Figure 5:
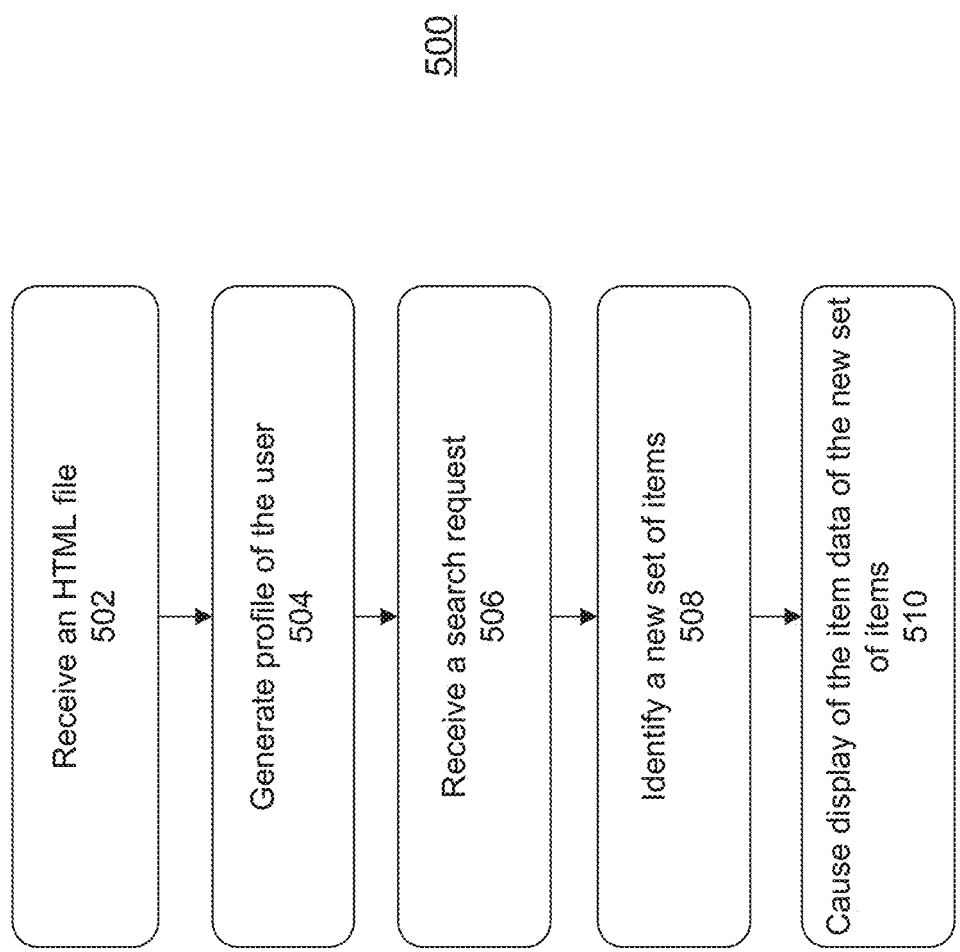
FIG. 5 is a flowchart illustrating a process for identifying a set of items to be rendered on a web site.

FIG. 5 is a flowchart illustrating a process for identifying a set of items to be rendered on a website, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps can be performed simultaneously or in a different order than shown in FIG. 5, as will be understood by a person of ordinary skill in the art.

Method 500 shall be described with reference to FIG. 1. However, method 500 is not limited to those example embodiments.

In operation 502, server 100 receives an HTML file including content from first website 110. Web-component 112-1 may be configured to extract the content of first website 110 in response to executing code embedded on first website 110. The content includes information about a search that was executed on first website 110 and returned a set of items. For example, the information about the search includes one or more of user click history, user viewing history, search parameters, or the item data about the set of items. The set of items may be a set of vehicles that correspond to the search results. In this regard, the content may include the search parameters and the item data about the set of vehicles.

In operation 504, analysis engine 102 generates a profile of the user. Specifically, analysis engine 102 identifies a set of elements about the search from the HTML file. The set of elements may include data related to the user click history, user viewing history, search parameters, or the item data about the set of items. Analysis engine 102 may generate a profile for the user based on the set of elements. The profile may include user preferences with respect to the items. In particular, the profile may include weights associated with each of the set of elements. The weights may indicate a degree of user preference.

In operation 506, analysis engine 102 receives a search request to identify a new set of items from second website 125. The search request may include search parameters. The search request may be for identifying a new set of vehicles available across different car dealerships based on the search parameters.

In operation 508, analysis engine 102 identifies a new set of items based on the search parameters and the profile. The new set of items may be a new set of vehicles available at various car dealerships. The new set of vehicles may include attributes that correspond to the user preferences in the profile. For example, if the user preferences may indicate that the desired color of the vehicle is green, and the desired make of the vehicle should be a HONDA, the new set of vehicles may include a green HONDA CIVIC.

In operation 510, analysis engine 102 causes a display of the item data about the new set of items. The item data of the new set of vehicles may include make, model, price, year, mileage, etc. The item data may also include where (e.g., at which car dealership) a respective vehicle of the new set of vehicles is available.

Figure 6:
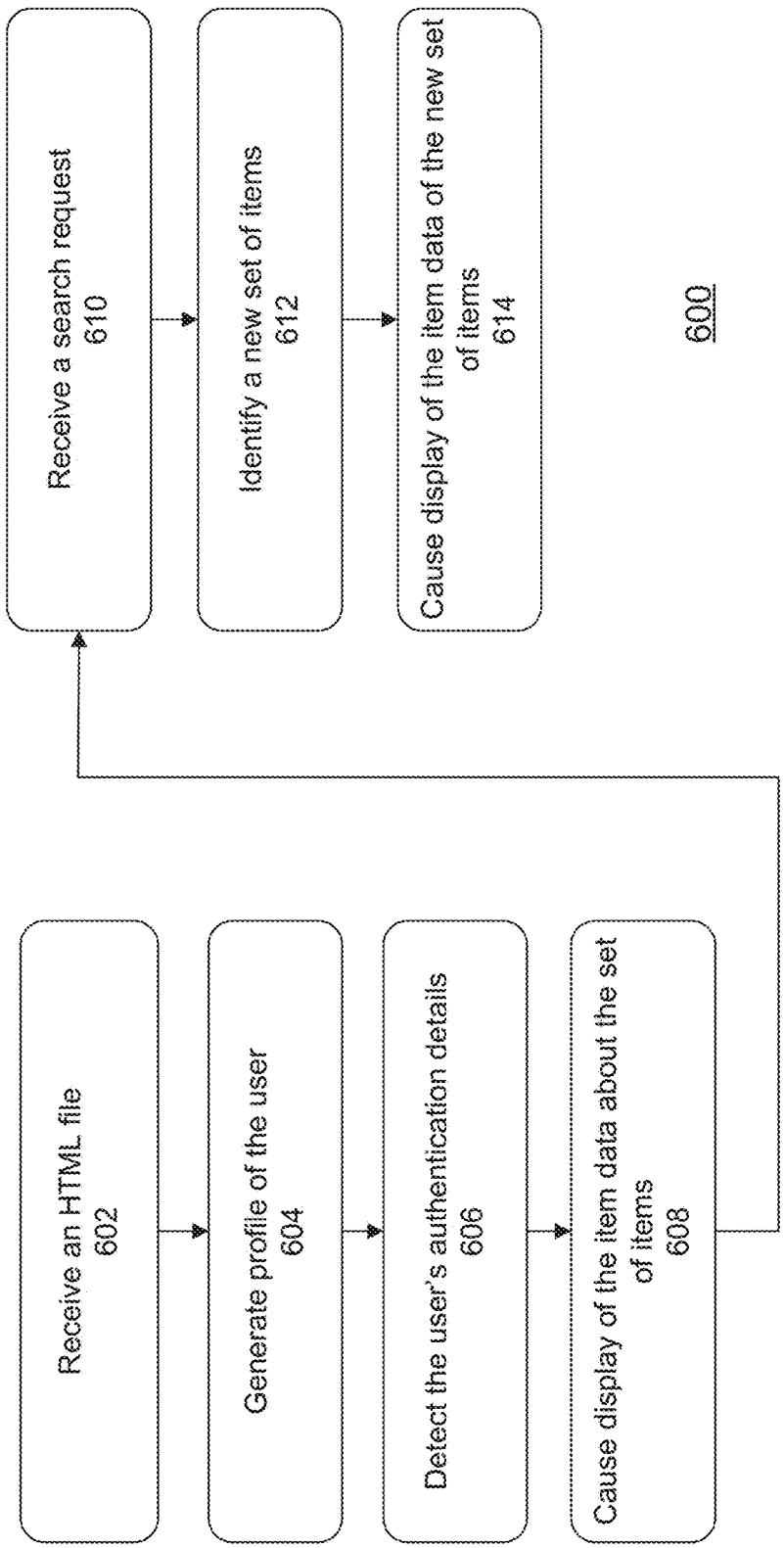
FIG. 6 is a flowchart illustrating a process for identifying a set of items to be rendered on a web site.

FIG. 6 is a flowchart illustrating a process for identifying a set of items to be rendered on a website, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 6, as will be understood by a person of ordinary skill in the art.

Method 600 shall be described with reference to FIG. 1. However, method 600 is not limited to those example embodiments.

In operation 602, server 100 receives an HTML file including content from first website 110. Web-component 112-1 may be configured to extract the content of first website 110 in response to executing code embedded on first website 110. The content includes information about a search that was executed on first website 110 and returned a set of items. For example, the information about the search includes one or more of user click history, user viewing history, search parameters, or the item data about the set of items. The set of items may be a set of vehicles that correspond to the search results. In this regard, the content may include the search parameters and the item data about the set of vehicles.

In operation 604, analysis engine 102 generates a profile of the user. Specifically, analysis engine 102 identifies a set of elements about the search from the HTML file. The set of elements may include data related to the user click history, user viewing history, search parameters, or the item data about the set of items. Analysis engine 102 may generate a profile for the user based on the set of elements. The profile may include user preferences with respect to the items. In particular, the profile may include weights associated with each of the set of elements. The weights may indicate a degree of user preference.

In operation 606, analysis engine 102 detects the user's authentication details being input on second website 125. The authentication details may be the user's username and password, and the user may input their username and password to sign in/log-in to second website 125. Second website 125 may transmit the user's username and password to server 100 for authentication. Analysis engine 102 may match the user identifier to the username and password of the user.

In operation 608, analysis engine 102 causes a display of the item data about the set of items. As indicated above, the set of items may be a set of vehicles. Analysis engine 102 may retrieve the item data about the set of vehicles from database 140 in response to detecting the user's authentication details being input on second website 125.

In operation 610, analysis engine 102 receives a search request for identifying a new set of items from second website 125. The search request may include search parameters. The search request may be for identifying a new set of vehicles available across different car dealerships based on the new set of elements.

In operation 612, analysis engine 102 identifies a new set of items based on the search parameters and the profile. The new set of items may be a new set of vehicles available at various car dealerships. The new set of vehicles may include attributes that correspond to user preferences in the profile.

In operation 614, analysis engine 102 causes a display of the item data about the new set of items.

Figure 7:
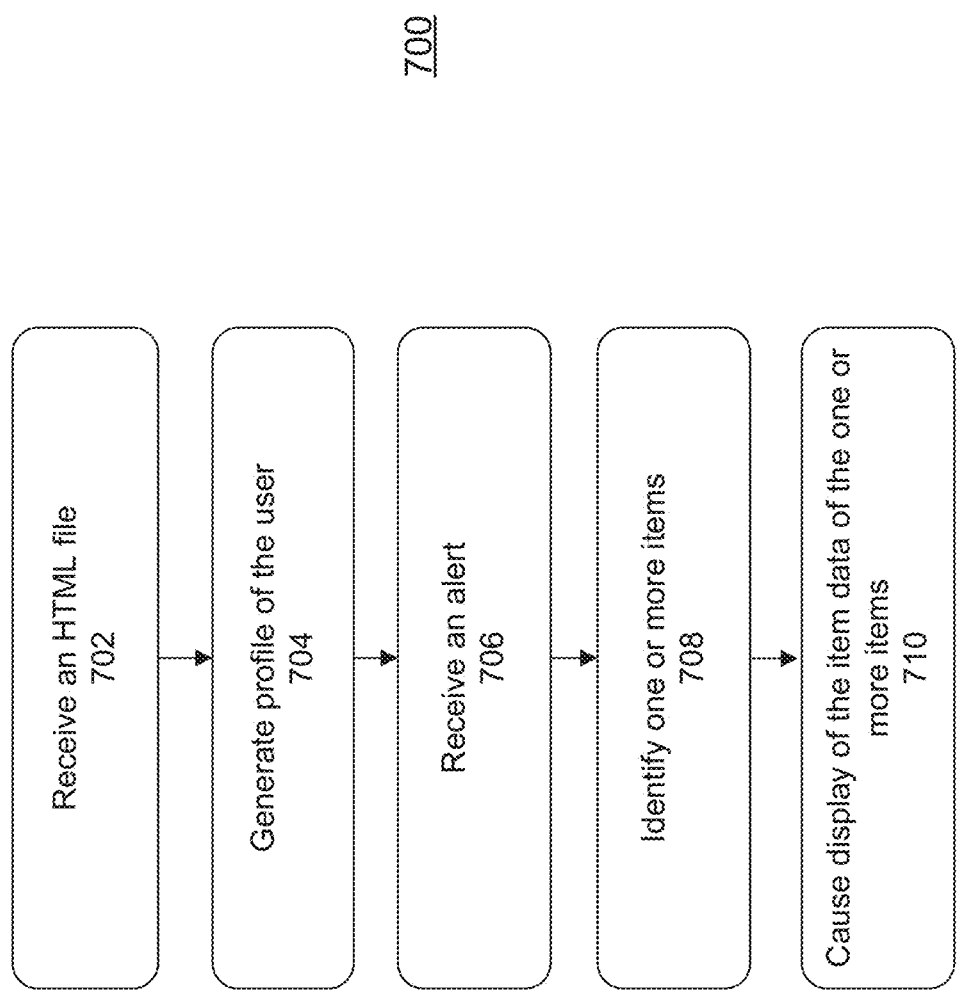
FIG. 7 is a flowchart illustrating a process for capturing request data on a website, according to some embodiments.

FIG. 7 is a flowchart illustrating a process for capturing request data on a website, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 7, as will be understood by a person of ordinary skill in the art.

Method 700 shall be described with reference to FIG. 1. However, method 700 is not limited to those example embodiments.

In operation 702, server 100 receives an HTML file including content from first website 110. Web-component 112-1 may be configured to extract the content of first website 110 in response to executing code embedded on first website 110. The content includes information about a search that was executed on first website 110 and returned a set of items. For example, the information about the search includes one or more of user click history, user viewing history, search parameters, or the item data about the set of items. The set of items may be a set of vehicles that correspond to the search results. In this regard, the content may include the search parameters and the item data about the set of vehicles.

In operation 704, analysis engine 102 generates a profile of the user. Specifically, analysis engine 102 identifies a set of elements about the search from the HTML file. The set of elements may include data related to the user click history, user viewing history, search parameters, or the item data about the set of items. Analysis engine 102 may generate a profile for the user based on the set of elements. The profile may include user preferences with respect to the items. In particular, the profile may include weights associated with each of the set of elements. The weights may indicate a degree of user preference.

In operation 706, analysis engine 102 receives an alert from web-component 112-2 indicating that third website 130 received a request to execute a search. The alert may include a user identifier and the search parameters of the search.

In operation 708, analysis engine 102 identifies one or more items that correspond to the search parameters and the profile. Specifically, analysis engine 102 determines one or more attributes of each of the one or more items that may correspond with the user preferences included in the profile. The one or more items may be available at the entity associated with third website 130.

In 710, analysis engine 102 causes a display of the item data about the one or more items on third website 130 in place of the GUI element corresponding to web-component 112-2. For example, the item data about the one or more items will be displayed on third website 130 in place of button 302, as illustrated in FIG. 3. The one or more items may be vehicles. The item data may include an image of the one or more vehicles and other information such as make, model, mileage, price, color, etc. The search results of third web site 130 may be displayed concurrently with the item data about the one or more items.

Figure 8:
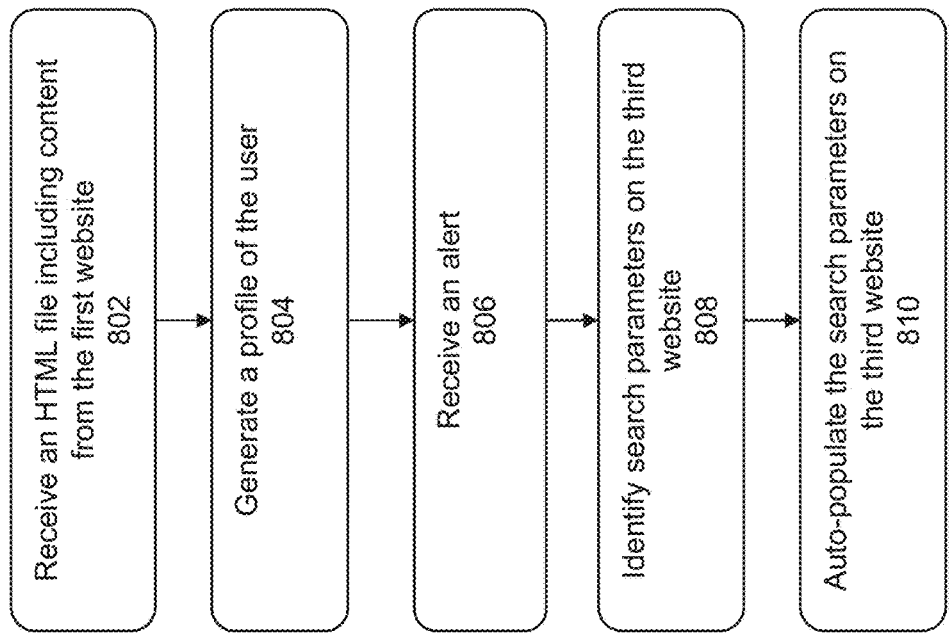
FIG. 8 is a flowchart illustrating a process for altering filters on a website, according to some embodiments.

FIG. 8 is a flowchart illustrating a process for altering filters on a website, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously or in a different order than shown in FIG. 8, as will be understood by a person of ordinary skill in the art.

Method 800 shall be described with reference to FIG. 1. However, method 800 is not limited to those example embodiments.

In operation 802, server 100 receives an HTML file including content from first website 110. Web-component 112-1 may be configured to extract the content of first website 110 in response to executing code embedded on first website 110. The content includes information about a search that was executed on first website 110 and returned a set of items. For example, the information about the search includes one or more of user click history, user viewing history, search parameters, or the item data about the set of items. The set of items may be a set of vehicles that correspond to the search results. In this regard, the content may include the search parameters and the item data about the set of vehicles.

In operation 804, analysis engine 102 generates a profile of the user. Specifically, analysis engine 102 identifies a set of elements about the search from the HTML file. The set of elements may include data related to the user click history, user viewing history, search parameters, or the item data about the set of items. Analysis engine 102 may generate a profile for the user based on the set of elements. The profile may include user preferences with respect to the items. In particular, the profile may include weights associated with each of the set of elements. The weights may indicate a degree of user preference.

In operation 806, analysis engine 102 receives an alert from web-component 112-2 indicating that the user has accessed third website 130. The alert may include a user identifier.

In operation 808, analysis engine 102 identifies one or more search parameters on third website 130 that correspond with the user's profile. Analysis engine 102 may receive an HTML file including content from third website 130. Web-component 112-2 may be configured to extract the content of first website 110 in response to executing code embedded on third website 130. The content includes information about the search parameters of third website 130. For example, the information may include the types of search parameters and types of input fields associated with the search parameters. Analysis engine 102 may identify the search parameters from the HTML file, including content from third website 130.

The user's profile may be retrieved using the user identifier. The search parameters may include filters for searching for items. The search parameters may be part of third website 130's search functionality. The search parameters may be displayed as input fields in third website 130's search. The input fields may include text input boxes, checkboxes, radio buttons, dropdown menus, etc. As a non-limiting example, the user profile may indicate that the user prefers vehicles that have mileage less than 50,000. As such, analysis engine 102 may identify the search parameter corresponding to mileage for third website 130.

In operation 810, analysis engine 102 instructs web-component 112-2 to auto-populate one or more search parameters on third website 130 with values corresponding to the user profile. For example, the user profile may indicate that the user prefers vehicles that have mileage less than 50,000 miles. As such, analysis engine 102 may instruct web-component 112-2 to auto-populate the search field for mileage on third website 130. If the search field is a dropdown, web-component 112-2 may select the option for mileage less than 50,000 miles. In this manner, analysis engine 102 may use alter the search parameters of third-website 130 based on the user's interaction with first website 110.

Various embodiments can be implemented, for example, using one or more computer systems, such as computer system 900 shown in FIG. 9. Computer system 900 can be used, for example, to implement methods 400 of FIG. 4, 500 of FIG. 5, 600 of FIG. 6, 700 of FIG>7, and 800 of FIG. 8. Furthermore, computer system 800 can be at least part of server 100, user device 120, and database 140, as shown in FIG. 1. For example, computer system 900 may route communication to various applications. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer-usable or readable storage device having stored thereon computer software (control logic) and/or data. Removable storage unit 918 can be a floppy disk, magnetic tape, compact disk, DVD, optical storage disk, and/any other computer database. Removable storage drive 914 reads from and/or writes to removable storage unit 918 in a well-known manner.

According to an exemplary embodiment, secondary memory 910 can include other means, instrumentalities, or other approaches for allowing computer programs and/or other instructions and/or data to be accessed by computer system 900. Such means, instrumentalities, or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick, and USB port, a memory card, and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method comprising:
   generating, by one or more computing devices, a HTML file including content of a first website from a web-component configured to extract the content of the first website based on executing code embedded in the first website, wherein the content includes information about a search that was executed on the first website and returned a set of items, and a user identifier of a user interfacing with the first website;
   generating, by the one or more computing devices, a profile of the user based on the information about the search in the HTML file;
   determining, by the one or more computing devices, that the user is prequalified for at least one item from the set of items;
   filtering, by the one or more computing devices, the set of items based on determining that the user is prequalified for at least one item from the set of items;
   identifying, by the one or more computing devices, a new item that corresponds to the profile and a first item of the filtered set of items, wherein the first item is identified based at least in part on an amount of time that the first item is displayed by the first website;

detecting, by the one or more computing devices, authentication details of the user on a second website based on the user identifier;

determining, by the one or more computing devices, that the HTML file was generated within a predetermined timeframe of detecting the authentication details of the user on the second website; and causing, by the one or more computing devices, the second website to display item data of the new item and an indication of the first item based on the determining that the HTML file was generated within the predetermined timeframe of the detecting the authentication details of the user.

2. The computer-implemented method of claim 1, wherein the information about the search includes one or more of: user click history, user viewing history, search parameters, or the item data about the set of items.

3. The computer-implemented method of claim 1, further comprising:

identifying, by the one or more computing devices, a set of elements based on the information about the search; and assigning, by the one or more computing devices, a weight to each element of the set of elements, wherein the profile includes the weight assigned to each element of the set of elements.

4. The computer-implemented method of claim 3, further comprising identifying, by the one or more computing devices, the new item that corresponds to one or more elements of the set of elements.

5. The computer-implemented method of claim 3, further comprising:

identifying, by the one or more computing devices, a set of attributes of the new item;

identifying, by the one or more computing devices, one or more attributes of the set of attributes of the new item that correspond to one or more elements of the set of elements;

determining, by the one or more computing devices, a score for the new item based on the identified one or more attributes and the weights assigned to the one or more elements of the set of elements; and determining, by the one or more computing devices, that the item data of the new item is to be displayed on the second website based on the score of the new item being more than a predetermined threshold.

6. The computer-implemented method of claim 1, further comprising:

receiving, by the one or more computing devices, a search request on the second website for a new set of items, wherein the search request includes search parameters;

identifying, by the one or more computing devices, the new set of items based on the profile and the search parameters; and causing, by the one or more computing devices, display of new item data about the new set of items on the second website.

7. The computer-implemented method of claim 1, further comprising:

receiving, by the one or more computing devices, additional HTML files including additional content of the first website based on additional users interfacing with the first website, wherein the content and the additional content includes a location of the user and the additional users, respectively, and the content includes additional information about additional searches for additional items executed on the first website;

determining, by the one or more computing devices, that the location of the user and the additional users is within a predetermined geographical region; and identifying, by the one or more computing devices, a characteristic about the location with respect to the set of items and the additional items based on the information about the search and the additional information about the additional searches.

8. The computer-implemented method of claim 1, further comprising:

causing, by the one or more computing devices, display of the item data of the at least one item of the set of items on the second website based on determining that the user is prequalified for the at least one item of the set of items and based on detecting input of the authentication details of the user on the second website.

9. A system comprising:

a memory;

a processor coupled to the memory, the processor configured to:

generate a HTML file including content of a first website from a web-component configured to extract the content of the first website based on executing code embedded in the first website, wherein the content includes information about a search that was executed on the first website and returned a set of items, and a user identifier of a user interfacing with the first website;

generate a profile of the user based on the information about the search in the HTML file;

determine, by the one or more computing devices, that the user is prequalified for at least one item from the set of items;

filter, by the one or more computing devices, the set of items based on determining that the user is prequalified for at least one item from the set of items;

identify a new item that corresponds to the profile and a first item of the filtered set of items, wherein the first item is identified based at least in part on an amount of time that the first item is displayed by the first website;

determine that the HTML file was generated within a predetermined timeframe of a detection of authentication details of the user on a second website, wherein the authentication details are detected based on the user identifier; and cause the second website to display item data of the new item and an indication of the first item based on the determination that the HTML file was generated within the predetermined timeframe of the detecting the authentication details of the user.

10. The system of claim 9, wherein the information about the search includes one or more of: user click history, user viewing history, search parameters, or the item data about the set of items.

11. The system of claim 9, wherein the processor is further configured to:

identify a set of elements based on the information about the search; and assign a weight to each element of the set of elements, wherein the profile includes the weight assigned to each element of the set of elements.

12. The system of claim 11, wherein the processor is further configured to:

identify a set of attributes of the new item;

identify one or more attributes of the set of attributes of the new item that correspond to one or more elements of the set of elements;

determine a score for the new item based on the identified one or more attributes and the weights assigned to the one or more elements of the set of elements; and determine that the item data of the new item is to be displayed on the second website based on the score of the item being more than a predetermined threshold.

13. The system of claim 9, wherein the processor is further configured to:

receive additional HTML files including additional content of the first website based on additional users interfacing with the first website, wherein the content and the additional content includes a location of the user and the additional users, respectively, and the content includes additional information about additional searches for additional items executed on the first website;

determine that the location of the users and the additional users is within a predetermined geographical region; and identify a characteristic about the location with respect to the set of items and the additional items based on the information about the search and the additional information about the additional searches.

14. The system of claim 9, wherein the processor further configured to:

determine that the user is prequalified for at least one item from the new set of items; and cause display of the item data about the at least one item of the new set of items on the second website based on determining that the user is prequalified for the at least one item of the new set of items and in response to detecting input of the authentication details of the user on the second website.

15. The computer-implemented method of claim 1, wherein the second website is an aggregator website.

16. The system of claim 9, wherein the second website is an aggregator website.

* * * * *